United States Patent
Khoueir et al.

(10) Patent No.: US 8,949,567 B2
(45) Date of Patent: Feb. 3, 2015

(54) CROSS-POINT RESISTIVE-BASED MEMORY ARCHITECTURE

(71) Applicant: Seagate Technology LLC, Cupertino, CA (US)

(72) Inventors: Antoine Khoueir, Apple Valley, MN (US); Jon D. Trantham, Chanhassen, MN (US); Kevin Gomez, Eden Prairie, MN (US); Ara Patapoutian, Hopkinton, MA (US)

(73) Assignee: Seagate Technology LLC, Cupertino, CA (US)

( * ) Notice: Subject to any disclaimer, the term of this patent is extended or adjusted under 35 U.S.C. 154(b) by 158 days.

(21) Appl. No.: 13/777,137

(22) Filed: Feb. 26, 2013

(65) Prior Publication Data

US 2014/0244946 A1    Aug. 28, 2014

(51) Int. Cl.
*G06F 13/00* (2006.01)
*G06F 12/00* (2006.01)

(52) U.S. Cl.
CPC ..................................... *G06F 12/00* (2013.01)
USPC ........... 711/170; 711/103; 711/152; 711/154; 710/43; 365/185.25; 365/134; 365/148; 365/158; 365/173

(58) Field of Classification Search
USPC .................... 711/103, 152, 154, 170; 710/43; 365/185.25, 134, 148, 158, 173
See application file for complete search history.

(56) References Cited

U.S. PATENT DOCUMENTS

| | | |
|---|---|---|
| 6,703,652 B2 | 3/2004 | Van Brocklin et al. |
| 6,791,132 B2 | 9/2004 | Nakai et al. |
| 7,009,903 B2 | 3/2006 | Perner et al. |
| 7,148,088 B2 | 12/2006 | Van Brocklin et al. |
| 7,239,540 B2 | 7/2007 | Inoue |
| 7,382,647 B1 | 6/2008 | Gopalakrishnan |
| 7,768,016 B2 | 8/2010 | Kreupl |
| 7,825,478 B2 | 11/2010 | Jung et al. |
| 7,859,896 B2 | 12/2010 | Kurotsuchi et al. |
| 7,935,619 B2 | 5/2011 | Jung et al. |
| 7,936,585 B2 | 5/2011 | Tian et al. |
| 8,027,215 B2 | 9/2011 | Lambertson et al. |
| 8,072,014 B2 | 12/2011 | Jung et al. |
| 8,203,873 B2 | 6/2012 | Gopalakrishnan |
| 8,208,285 B2 | 6/2012 | Khoury et al. |
| 8,254,196 B2 | 8/2012 | Lambertson et al. |
| 8,284,597 B2 | 10/2012 | Chang et al. |
| 2009/0109728 A1* | 4/2009 | Maejima et al. .............. 365/148 |
| 2010/0117160 A1 | 5/2010 | Jung et al. |
| 2010/0135061 A1 | 6/2010 | Li et al. |
| 2010/0210095 A1 | 8/2010 | Jung et al. |
| 2011/0007547 A1 | 1/2011 | Khoury et al. |

(Continued)

OTHER PUBLICATIONS

Li et al., "An Overview of Non-Volatile Memory Technology and the Implication for Tools and Architectures", Design, Automation & Test in Europe Conference & Exhibition, 2009, 6 pages.

*Primary Examiner* — Reba I Elmore
(74) *Attorney, Agent, or Firm* — Hollingsworth Davis, LLC

(57) ABSTRACT

A plurality of addressable memory tiles each comprise one or more cross-point arrays. Each array comprises a plurality of non-volatile resistance-change memory cells. A controller is configured to couple to the array and to a host system. The controller is configured to perform receiving, from the host system, one or more data objects each having a size equal to a predetermined logical block size, and storing the one or more data objects in a corresponding integer number of one or more of the memory tiles.

20 Claims, 9 Drawing Sheets

(56) References Cited

U.S. PATENT DOCUMENTS

| | | |
|---|---|---|
| 2011/0032748 A1 | 2/2011 | Jung et al. |
| 2011/0051492 A1* | 3/2011 | Toda .............................. 365/148 |
| 2011/0170335 A1 | 7/2011 | Khoury et al. |
| 2012/0039111 A1 | 2/2012 | Jung et al. |
| 2012/0099367 A1* | 4/2012 | Azuma et al. ................. 365/148 |
| 2012/0155148 A1* | 6/2012 | Takase .......................... 365/148 |
| 2012/0241706 A1 | 9/2012 | Lee et al. |

\* cited by examiner

CROSS-POINT RESISTIVE-BASED MEMORY ARCHITECTURE

SUMMARY

The present disclosure is related to apparatuses and methods employing memory arrays comprising non-volatile memory cells. Embodiments of the disclosure are directed to data transfer methodologies and structures that preempt various disturb conditions from arising in memory arrays comprising non-volatile memory cells. Embodiments of the disclosure are directed to data transfer methodologies and structures that mitigate leakage current interference between non-volatile memory cells of a memory array. Embodiments of the disclosure are directed to data transfer methodologies and structures for use with cross-point resistive-based memory arrays that are devoid of a switch, diode, or other select component at cross-points of the arrays.

According to some example embodiments, an apparatus includes a cross-point array comprising a plurality of non-volatile resistance-change memory cells defining a plurality of addressable memory tiles. A controller is configured to couple to the array and to a host system. The controller is configured to perform receiving, from the host system, one or more data objects each having a size equal to a predetermined logical block size, and storing the one or more data objects in a corresponding integer number of one or more memory tiles of the array. In some embodiments, each of the memory tiles has a size that exactly matches the predetermined logical block size of a file system used by the host system. In other embodiments, the controller is configured to append one or more of error correcting code bytes, error detecting code bytes, and pad bytes to the one or more data objects such that the total storage required for each of the one or more data objects exactly matches the storage capacity of an integer number of the memory tiles.

According to other example embodiments, an apparatus includes a cross-point memory array comprising a plurality of word lines and a plurality of bit lines intersecting the plurality of word lines at a plurality of cross-points. A resistance-change memory cell is provided at each of the cross-points. Each of the memory cells has an area of $4F^2$, where F denotes a minimum working dimension. The resistance-change memory cells define a plurality of addressable memory tiles. A controller is configured to couple to the cross-point array and to a host system. The controller is configured to perform receiving, from the host system, one or more data objects each having a size equal to a predetermined logical block size, and storing the one or more data objects in a corresponding integer number of one or more memory tiles of the array. In some embodiments, each of the memory tiles has a size that exactly matches the predetermined logical block size of a file system used by the host system. In other embodiments, the controller is configured to append one or more of error correcting code bytes, error detecting code bytes, and pad bytes to the one or more data objects such that the total storage required for each of the one or more data objects exactly matches the storage capacity of an integer number of the memory tiles.

In further example embodiments, a method facilitates receiving one or more data objects each having a size equal to a predetermined logical block size, and storing the one or more data objects in a corresponding integer number of one or more addressable memory tiles each comprising one or more cross-point arrays. Each array comprises a plurality of cross points and each cross point comprising a non-volatile resistance-change memory cell and devoid of a select component. In some embodiments, each of the memory tiles has a size that exactly matches the predetermined logical block size. In other embodiments, the method further comprises appending one or more of error correcting code bytes, error detecting code bytes, and pad bytes to the one or more data objects such that the total storage required for each of the one or more data objects exactly matches the storage capacity of an integer number of the memory tiles.

These and other features and aspects of various embodiments may be understood in view of the following detailed discussion and accompanying drawings.

BRIEF DESCRIPTION OF THE DRAWINGS

In the following diagrams, the same reference numbers may be used to identify similar/same components in multiple figures.

DETAILED DESCRIPTION

In the following description of various example embodiments, reference is made to the accompanying drawings that form a part hereof, and in which is shown by way of illustration various example embodiments. It is to be understood that other embodiments may be utilized, as structural and operational changes may be made without departing from the scope of the claims appended hereto.

The present disclosure is generally related to persistent data storage devices, such as those using non-volatile solid-state memory. Particular embodiments are directed to solid-state memory devices comprising memory cells whose internal resistance can be persistently altered by the application of a signal. Representative examples of resistance-change memory cells include resistive random-access memory (RRAM or ReRAM) cells, phase-change random-access memory (PCM) cells, spin torque transfer random-access memory (STTRAM) cells, programmable metallization memory (PMM) cells, ferroelectric random-access memory (FeRAM) cells, and carbon nanotube random-access memory (CNT or NRAM) cells, for example.

Resistance-change random-access memory has the potential of becoming a popular mass storage technology due to its simple and compact cell structure, fast switching time, low power consumption, long retention time, and scalable architecture. Resistance-change memory cells implemented a cross-point memory, for example, can be used to achieve high memory density. A significant technical hurdle to realizing the potential of resistance-change random-access memory concerns leakage current, also referred to as sneak current, which is present in the cross-point memory array and becomes particularly problematic during certain operations. Resistance-change memory cells in a cross-point array suffer from interference from leakage current from neighboring cells which impedes implementation of high-density memory cell arrays. For example, the sneak current through unselected cells creates a disturbance problem during a read operation. Incorporating components at individual memory cell locations can help to control excessive leakage current within a resistance-change cross-point memory array, but such components are typically larger than their corresponding memory cells, resulting in reduced memory array density.

Figure 1:
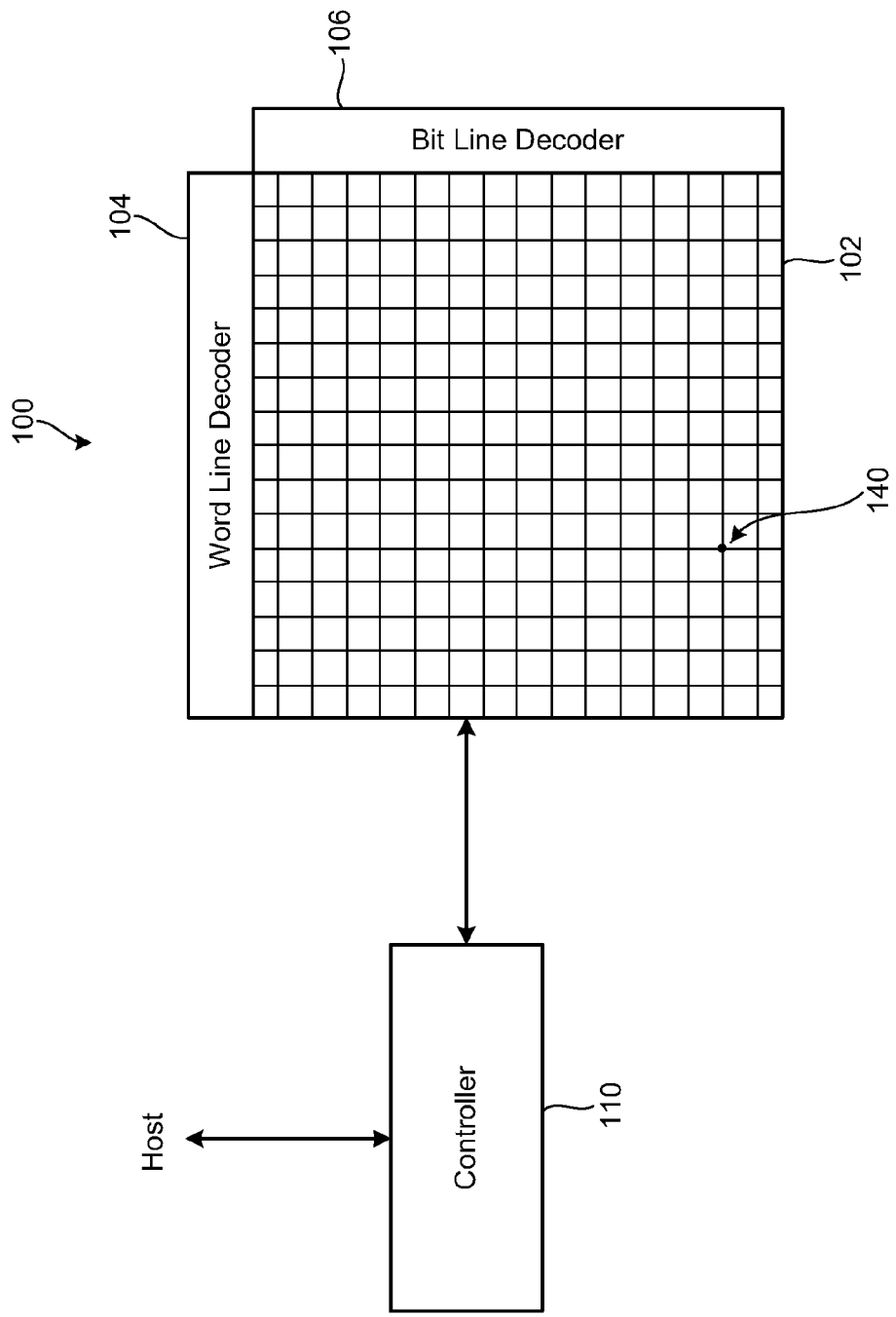
FIG. 1 is a block diagram of a data storage apparatus implemented and operated in accordance with various embodiments.

Referring now to FIG. 1, there is shown a block diagram of a data storage apparatus 100 implemented and operated in accordance with various embodiments. The storage apparatus 100 includes a controller 110 coupled to a data storage array 102. The controller 110 is also coupled to a host via an appropriate interface. The controller 110 is configured to transfer user data between the data storage array 102 and the host. According to various embodiments, the storage apparatus 100 is characterized as a solid-state drive (SSD), the controller 110 comprises a programmable microcontroller, and the data storage array 102 comprises an array of non-volatile memory cells 140. In some embodiments, the data storage array 102 can include separate word line and bit line decoders 104 and 106, respectively, to provide access to selected memory cells 140 of the data storage array 102. Various configurations and modes of operation with respect to the various components of the data storage apparatus 100 are contemplated, and can be modified as desired.

Figure 2:
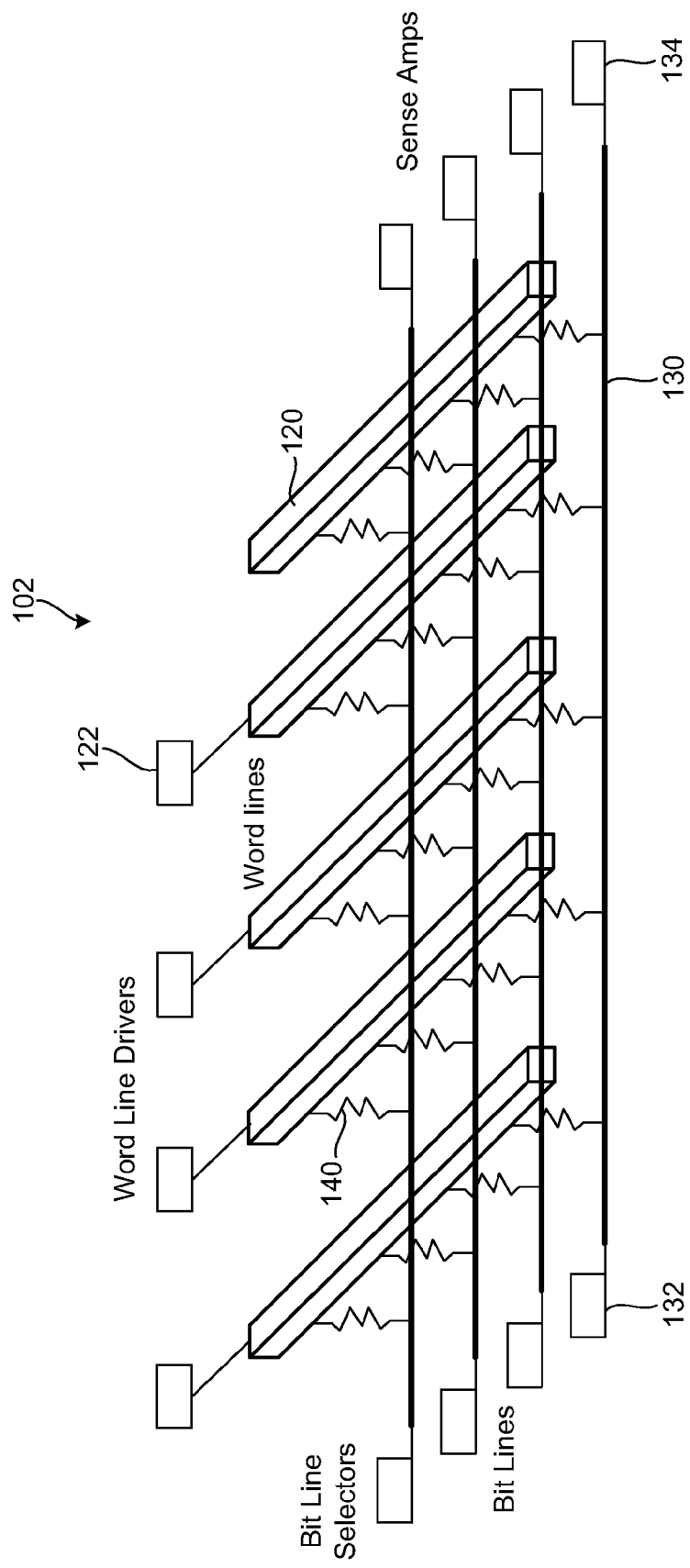
FIG. 2 shows a portion of a data storage array implemented as a cross-point memory array comprising resistance-change memory cells according to various embodiments.

FIG. 2 shows a portion of a data storage array 102 capable of providing access to one or more memory cells 140. The data storage array 102 shown in FIG. 2 is implemented as a cross-point memory array comprising resistance-change memory cells according to various embodiments. The memory array 102 includes a multiplicity of upper electrodes 120, which are space-apart from one another in a parallel relationship. The memory array 102 also includes a multiplicity of lower electrodes 130, which are space-apart from one another in a parallel relationship. The upper electrodes 120 overlie the lower electrodes 130 and are oriented generally orthogonal to one another such that the upper and lower electrodes 120 and 130 cross each other in a regular pattern. The locations where the upper and lower electrodes 120 and 130 cross each other are referred to a cross-points. A resistance-change memory cell 140 is coupled to an upper electrode 120 and a lower electrode 130 at each cross-point. The upper electrodes 120 and the lower electrodes 130 can each function as either word lines or bit lines. For purposes of illustration, the upper electrodes 120 shown in FIG. 2 represent word lines, and the lower electrodes 130 represent bit lines.

Word line drivers 122 are coupled to the word lines 120. As illustrated, one word line driver 122 is coupled to one word line 120 of the memory array 102. Bit line selectors 132 and sense amplifiers 134 are coupled to the bit lines 130. As illustrated, one bit line selector 122 and one sense amplifier 134 is coupled to one bit line 130 of the memory array 102. In the case of a multiple-layer memory array, which would incorporate multiple levels of the memory array 102 stacked vertically (see, e.g., FIG. 4), it is possible to share certain components peripheral to the array 102, such as the word line drivers 122 for example, depending on the array's architecture. In some embodiments, the word line drivers 122, bit line selectors 132, and sense amplifiers 134 are situated peripheral to the array of memory cells 140. In other embodiments, these peripheral components can be folded underneath the array of memory cells 140, thereby providing additional space savings and increased memory density.

Programming the resistance-change memory cells 140 is accomplished by applying either a SET voltage (VSET) or a RESET voltage (VRESET). According to various embodiments, "SET" is defined as the transition of memory cells 140 from a high-resistance state to a low-resistance state, while "RESET" brings the memory cells 140 back to a high-resistance state from a low-resistance state. It is noted that some resistance-change cell technologies are more reliable and demonstrate a faster switching speed when operating in the bipolar mode. In this mode, VRESET is a negative bias while VSET is a positive bias.

Figure 3:
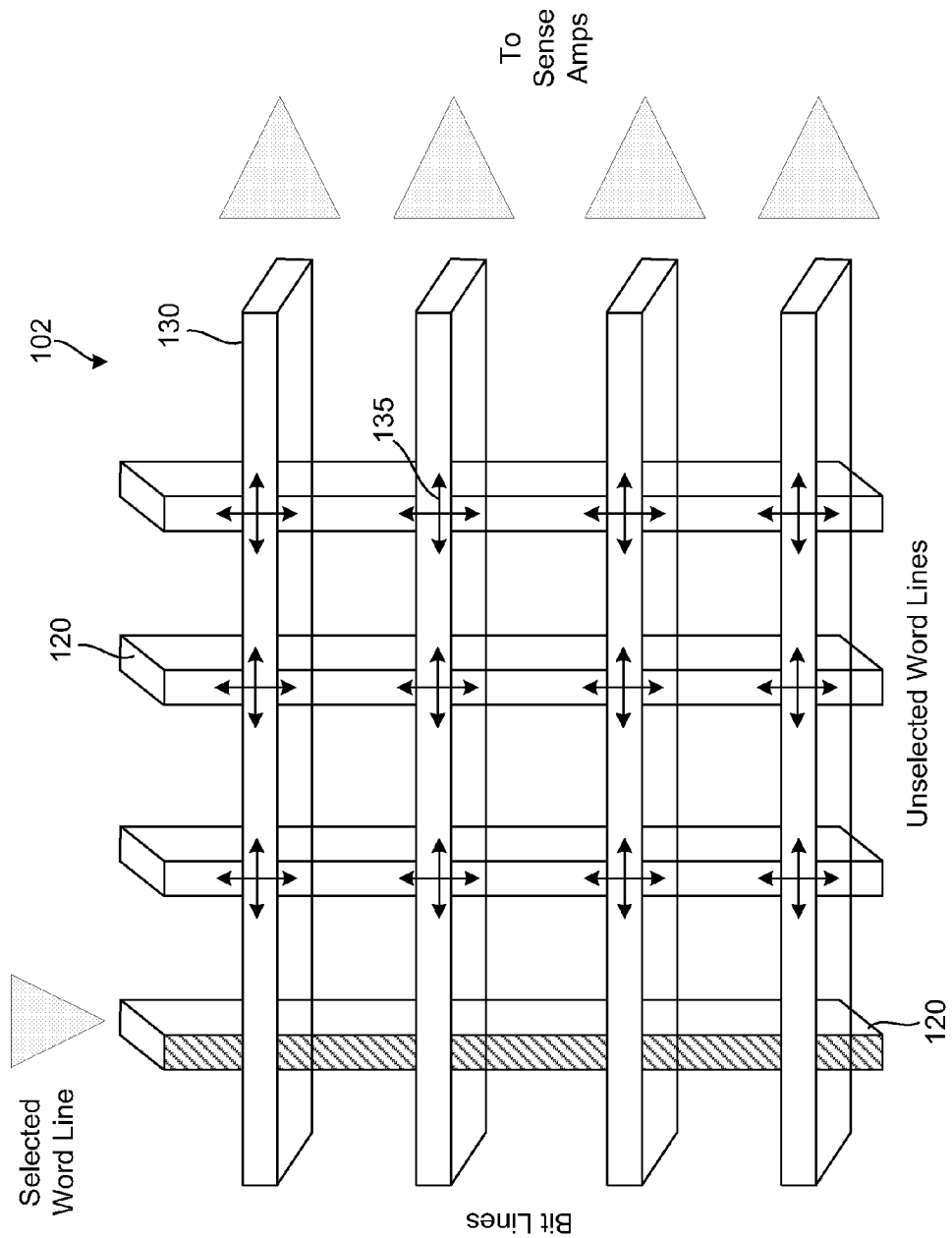
FIG. 3 is a portion of a data storage array showing unwanted leakage or sneak current flows that arise during data access operations within a cross-point memory array comprising resistance-change memory cells according to various embodiments.

The memory array 102 is accessed word line-by-word line. During a read operation, a selected word line 120 is raised to VREAD and a read current is driven in parallel through the bit lines 130. The unselected word lines 120 are terminated with high-impedances while each bit line 130 is connected to an individual sense amplifier 134 at one end. In this manner, the sense amplifiers 134 should ideally provide the only current path to ground. As previously discussed, and with reference to FIG. 3, operation of the cross-point memory array 102 can produce unwanted leakage (sneak) current 135 during data access operations. For example, leakage current 135 can flow along leakage paths through the unselected word lines 120. The leakage current 135 worsens when the majority of the memory cells 140 are in the low-resistance state, as this allows more leakage current to traverse between bit lines 130 and cause read errors.

Figure 4:
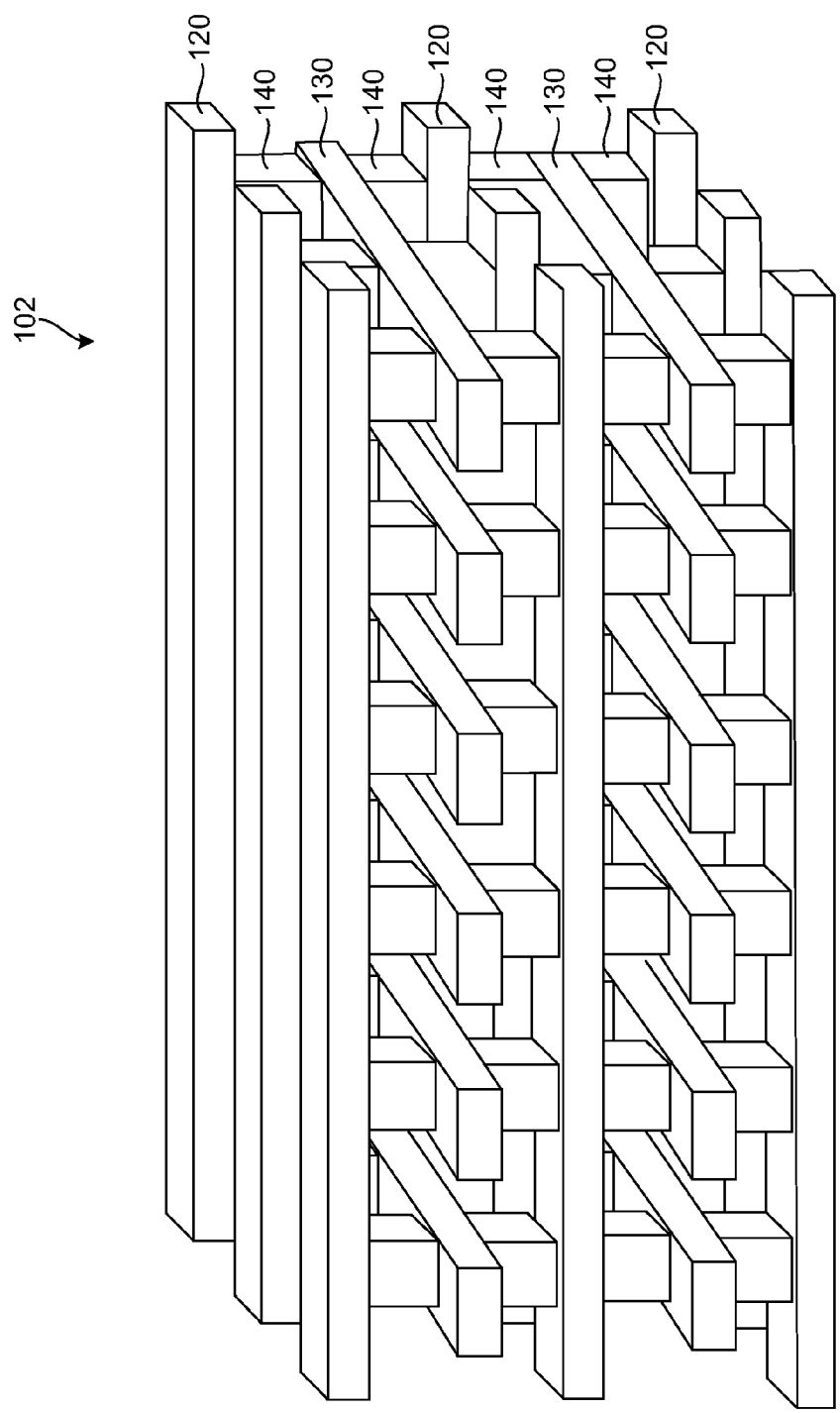
FIG. 4 shows a portion of a multi-level cross-point memory array stack comprising resistance-change memory cells in accordance with various embodiments.

FIG. 4 shows a portion of a cross-point memory array stack in accordance with various embodiments. The memory array stack 102-A includes a multiplicity of repeating array layers, each of which has a matrix of word lines 120, bit lines 130, resistance-change memory cells 140, and peripheral components as shown in FIG. 2. It can be appreciated that the challenge of adequately controlling leakage current within a resistance-change memory array increases significantly when implementing a multi-level (3 dimensional) resistance-change memory array stack 102-A of a type shown in FIG. 4.

In order to realize memory arrays of very high density, it is desirable to fabricate a cross-point memory array with features having the smallest working dimension (F) as possible for a given process technology. As was previously mentioned, switches (e.g., transistors), diodes, or other select devices coupled to the memory element can be incorporated at each cross-point in the memory array to control excessive leakage current, but at the cost of increasing the array size. According to various embodiments, excessive leakage current within a cross-point memory array can be mitigated without the need for a switch (e.g., transistors), diode, or other select device at each cross-point in the memory array. In accordance with some embodiments, a data storage apparatus can be implemented that utilizes a cross-point memory array which is devoid of a switch, diode, or other select device that controls leakage current at cross-points in the memory array.

According to various embodiments, a data storage apparatus includes a cross-point memory array comprising resistance-change memory cells each having an area of $4F^2$, where F denotes a minimum working dimension. According to other embodiments, a data storage apparatus includes a multi-layer cross-point memory array stack (3 dimensional array) comprising resistance-change memory cells each having an effective area of $4F^2$, such that an n-layer stack provides for an effective memory cell size of $4F2/n$. In some cross-point memory array embodiments, the resistance-change memory cell may have an area greater than $4F^2$ due to the particular construction of the memory cell. Embodiments that employ such resistance-change memory cells still provide for increased memory density resulting from the elimination of a switch, diode, or other select device at the cross-points in the memory array.

FIG. 5-10 illustrate different types of resistance-change memory cells in accordance with various embodiments. The resistance-change memory cells shown in FIGS. 5-10 can be incorporated at each cross-point of a cross-point memory array according to various embodiments. In general, these and other suitable resistance-change memory cell technologies can exhibit a persistent change in resistance in response to the application of a sufficiently high voltage or current.

Figure 5:
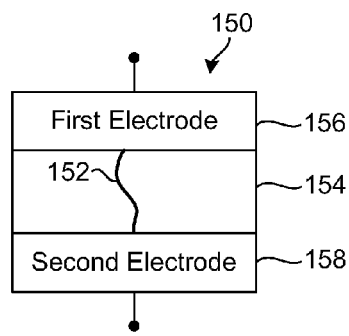
FIG. 5-10 illustrate different types of resistance-change memory cells that can be incorporated at each cross-point of a cross-point memory array according to various embodiments.

FIG. 5 shows a representative resistance-change memory cell 150 implemented as a resistive random-access memory (RRAM or ReRAM) cell. The memory cell 150 includes a conductive filament 152 selectively formed in an oxide layer 154 to transition the memory cell 150 from a high resistive state to a low resistive state. The memory cell 150 can formed from opposing metal or metal alloy electrode layers 156, 158 separated by the intervening oxide layer 154. In some embodiments, the oxide layer 154 provides the memory cell 150 with a high resistive state. Application of a suitable programming voltage across the memory cell 150 induces metal migration from one or both of the electrodes 156, 158, resulting in the formation of one or more conductive filaments 152 that extend across the oxide layer 154. The filament(s) 152 significantly reduce the resistance of the memory cell 150 to a second, low resistive state. Subsequently, the filament(s) 152 can be retracted by the application of a second programming voltage opposite the first voltage, thereby returning the memory cell 150 to its initial, high resistance state.

Figure 6:
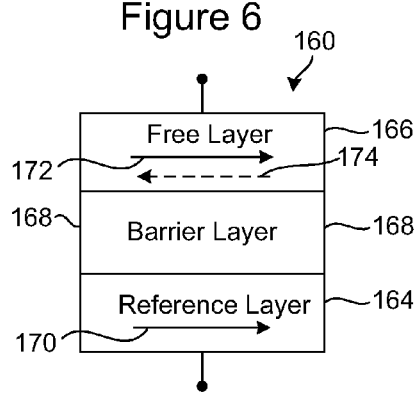

FIG. 6 is an illustration of a representative resistance-change memory cell 160 in accordance with various embodiments. The resistance-change memory cell 160 shown in FIG. 6 is implemented as a spin-torque random-access memory (STRAM) cell. The memory cell 160 can be characterized as a magnetic tunneling junction (MTJ) with a fixed reference layer 164 and a programmable free layer 166 (recording layer) separated by an intervening tunneling (barrier) layer 168. The reference layer 164 has a fixed magnetic orientation in a selected direction, as indicated by arrow 170. This fixed magnetic orientation can be established in a number of ways, such as via pinning to a separate magnet (not shown). The free layer 166 has a selectively programmable magnetic orientation that can be parallel (solid arrow 172) or anti-parallel (dotted arrow 174) with the selected direction of the reference layer 164. Other respective magnetization orientations can be used, as desired.

In operation, a low resistance state for the memory cell 160 is achieved when the magnetization of the free layer 166 is oriented to be substantially in the same direction (parallel) as the magnetization of the reference layer 164. To orient the memory cell 160 in the parallel low resistance state, a write current passes through the memory cell 160 so that the magnetization direction of the reference layer 164 sets the magnetic orientation of the free layer 166. A high resistance state for the memory cell 160 is established in the anti-parallel orientation in which the magnetization direction of the free layer 166 is substantially opposite that of the reference layer 164. To orient the memory cell 160 in the anti-parallel resistance state, a write current passes through the memory cell 160 from the reference layer 164 to the free layer 166 so that spin-polarized electrons flow into the free layer 166 in the opposite direction.

Figure 7:
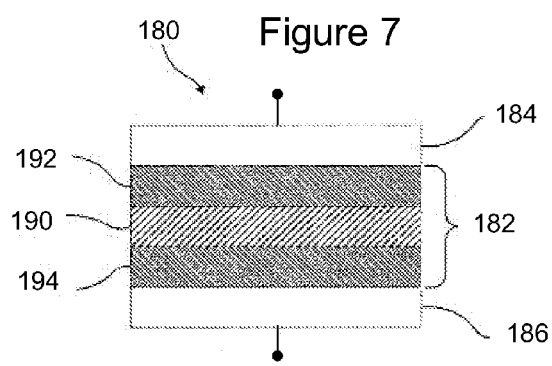

FIG. 7 illustrates a representative resistance-change memory cell 180 implemented as a ferroelectric random-access memory (FeRAM) cell in accordance with some embodiments. The memory cell 180 includes a stack or laminate 182 having multiple ferroelectric material layers positioned between a first electrode 184 and a second electrode 186. The laminate 182 and first and second electrodes 184, 186 may further be formed adjacent a substrate (not shown). Further, additional layers (not shown) providing a number of features may also be included in certain embodiments depending upon the particular implementation. According to various embodiments, the laminate 182 (or one or more layers within the laminate) exhibits a variable resistance under certain circumstances which allows it to store data in two or more states. One or more of the ferroelectric material layers within the stack include a variable resistance material that has a changes (e.g., reverses) resistance in response to certain polarities and/or magnitudes of an electrical signal (voltage or current) applied between the first and second electrodes 184, 186.

When an electrical signal energizes the laminate 182, one or more of the material layers within the laminate experience a remnant ferroelectric polarization that at least partially remains after the electrical signal is removed. The direction of the polarization depends upon the amplitude and polarity of the electrical signal. Data can be stored by assigning values to different polarizations. For example, one polarization direction may signify a set state, while the opposite polarization direction signifies a reset state. Each polarization state is associated with a unique resistance which affects current flow through the memory cell 180. The polarization state, and thus the stored information, can be determined by sensing the conduction levels from the memory cell 180.

Figure 8:
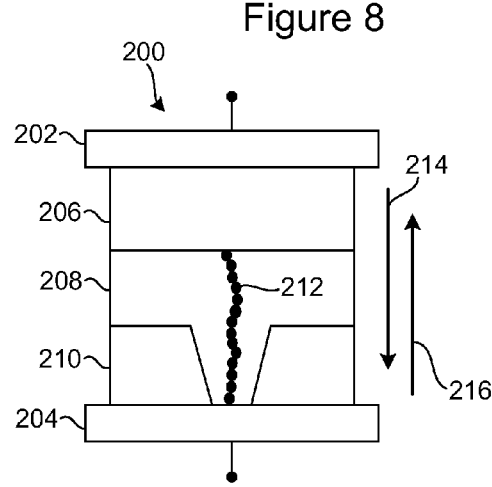

FIG. 8 illustrates a representative resistance-change memory cell 200 constructed as a programmable metallization cell (PMC) in accordance with various embodiments. The memory cell 200 shown in FIG. 8 can provide retention of resistive states through the use of ionic filament formation. The memory cell 200 includes top and bottom electrodes 202, 204, a metal layer 206, an electrolyte layer 208, and a dielectric layer 210. A potential difference between the first and second electrodes 202, 204 results in passage of a write current 214 through the resistance-change memory cell 200 to form a filament 212. The filament 212 establishes an electrically conductive path between the metal layer 206 and the bottom electrode 204 by the migration of ions from the metal layer 206 and electrons from the bottom electrode 204. The dielectric layer 210 focuses a small area of electron migration from the bottom electrode 204 in order to control the position of the resulting filament 212. The filament 212 reduces the effective resistance of the memory cell 200 to a relatively low resistance, which can be assigned a selected logical value, such as logical 1. Subsequent application of a write current 216 in a second direction through the memory cell 200 causes migration of the ions and electrons back to the respective electrodes 202, 204. This resets the memory cell 200 to its initial high electrical resistance, which can be assigned a different logical value, such as logical 0.

Figure 9:
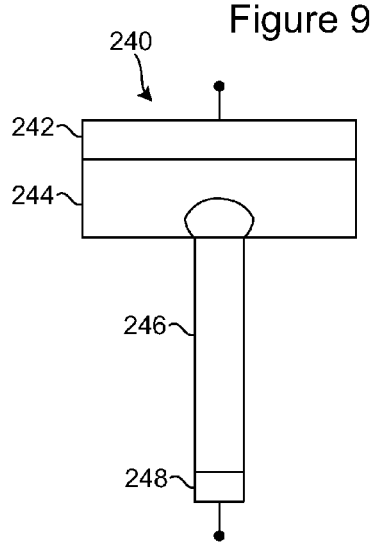

FIG. 9 shows a representative resistance-change memory cell 240 implemented as a phase-change memory (PCM) cell in accordance with various embodiments. The memory cell 240 includes a layer of chalcogenide material 244 sandwiched between a top electrode 242 and a bottom electrode 248. A resistive heating element 246 extends from the bottom electrode 248 and contacts a layer of the chalcogenide material 244. Current injected into the junction of the chalcogenide material 244 and the heater 246 induces a phase change through Joule heating. Phase change chalcogenides exhibit a reversible phase change phenomenon when changed from an amorphous phase to a crystalline phase. In the amorphous phase, the chalcogenide material 244 is highly disordered and exhibits high resistivity. In the polycrystalline phase, the chalcogenide material 244 has a regular crystalline structure and exhibits low resistivity.

Figure 10:
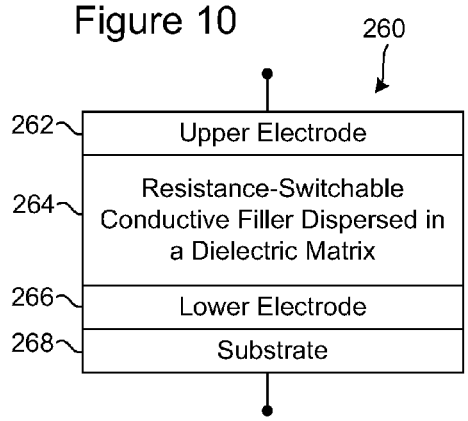

FIG. 10 illustrates a representative resistance-change memory cell 260 constructed as a carbon nanotube or nanowire memory (e.g., CNT or NRAM) cell in accordance with various embodiments. The memory cell 260 shown in FIG. 10 includes a lower electrode 266 disposed on a substrate 268, an upper electrode 262, and a resistance-switchable material 264 disposed between the lower and upper electrodes 266, 262. In some embodiments, the resistance-switchable material 264 comprises a resistance-switchable conductive filler dispersed in a dielectric matrix. The resistance-switchable conductive filler may comprises a conductive filler and a transition metal oxide layer formed on the conductive filler. According to various embodiments, the conductive filler includes at least one of a single-walled carbon nanotube, Ag nanowire, Au nanowire, Pt nanowire, Cu nanowire, and grapheme. In various embodiments, the transition metal oxide includes at least one of $TiO_2$, $ZrO_2$, $NiO$, $HfO_2$, $Ta_2O_5$, $La_2O_3$, $Nb_2O_5$, $Cu_2O$, $Al_2O_3$, $SiO$, $SrTiO_3$, Cr-doped $SrZrO_3$ and $Pr_{0.7}Ca_{0.3}MnO_3$. According to some embodiments, the dielectric can be a urethane, poly(vinyl alcohol) or silicone rubber.

Embodiments of the disclosure are directed to mitigating leakage current interference within a cross-point memory array comprising resistance-change memory cells without need for a switch, diode, or other select device to control leakage current within the array. Embodiments of the disclosure are directed to apparatuses and methods that utilize a data access methodology which uses all memory cells of a specified memory array structure for storing user data, thereby preempting the flow of leakage current between memory cells of the specified memory array structure. Embodiments of the disclosure are directed to apparatuses and methods that select all memory cells of a specified memory array structure when accessing the specified memory array structure, thereby preempting disturb conditions during read and write operations. Embodiments of the disclosure are directed to apparatuses and methods that utilize data objects representative of user data having a logical block size equal to (or made equal to by memory controller processing) the size of the specified memory array structure, thereby ensuring that all memory cells of the specified memory array structure are selected when accessing the specified memory array structure.

According to various embodiments, the specified memory array structure is referred to herein as a memory tile. In some embodiments, a memory tile can have a size matched to a minimum logical block size used by a host file system. Representative minimum logical block sizes used by host file systems can be 512 bytes (B), 1 kB (1024 bytes), 2 kB (2048 bytes), and 4 kB (4096 bytes), for example. The size of the memory tiles corresponding to these representative minimum logical block sizes would be 512 bytes, 1 kB, 2 kB, and 4 kB, respectively.

In other embodiments, a memory tile can be larger than a minimum logical block size used by the host file system. For example, host data blocks can be appended by the memory controller to also include one or more of error correcting code (ECC) bytes, error detecting code (EDC) bytes, and padding or pad bytes in order to match the host data block size to the memory tile size. In some embodiments, the memory tile sizes would be larger by the amount of ECC and EDC bytes desired for a given memory type. In other embodiments, multiple integer quantities of memory tiles can be used to store a logical host data block. For example, if the host data block size (plus EDC and ECC) was 4 kB, the memory tile size could be 1 kB, and four tiles could be used to hold one logical host block, so long as fractional quantities of memory tiles are avoided.

Figure 11:
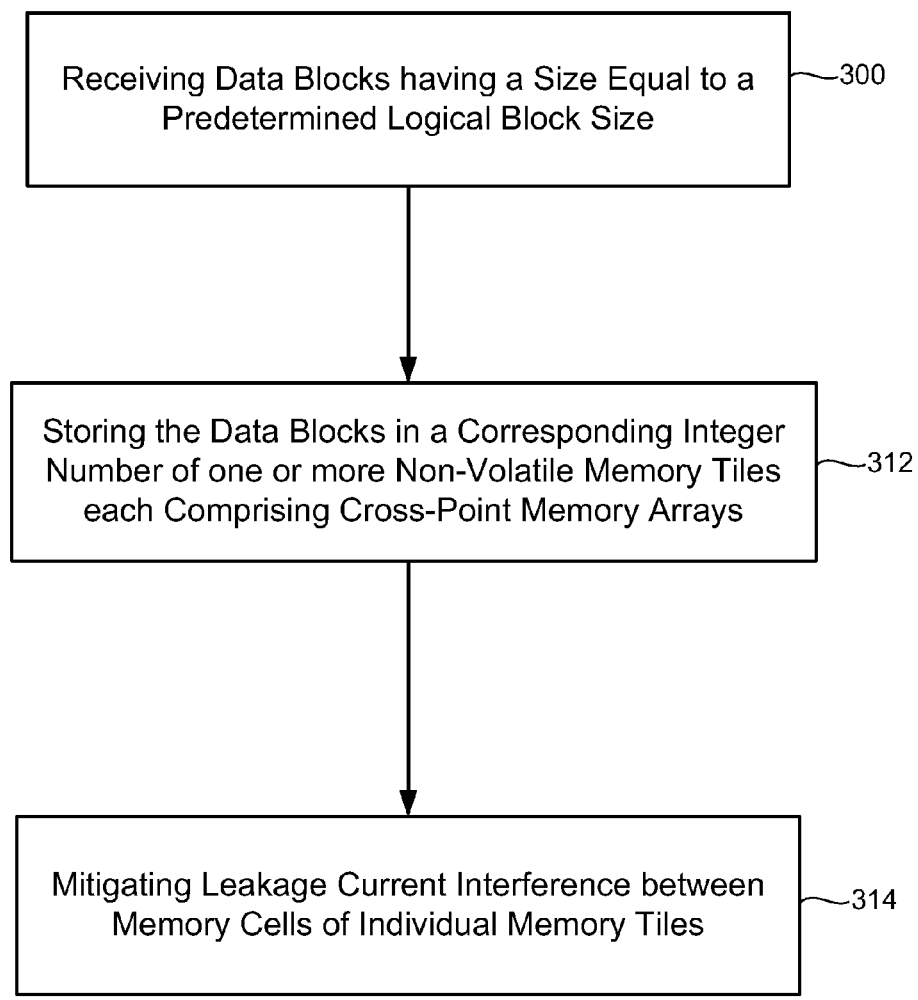
FIG. 11 is a flow diagram illustrating a method of mitigating leakage current interference between neighboring memory cells of a cross-point memory array comprising resistance-change memory cells in accordance with various embodiments.

Turning now to FIG. 11, there is shown a flow diagram illustrating a method of mitigating leakage current interference between neighboring memory cells of a cross-point memory array comprising resistance-change memory cells in accordance with various embodiments. The representative method shown in FIG. 11 involves receiving 300 data blocks having a size equal to a predetermined logical block size. The method further involves storing 312 the data blocks in a corresponding number integer number of one or more non-volatile memory tiles each comprising one or more cross-point memory arrays. The methodology illustrated in FIG. 11 provides for mitigation 314 of leakage current interference between memory cells of individual memory tiles.

Figure 12:
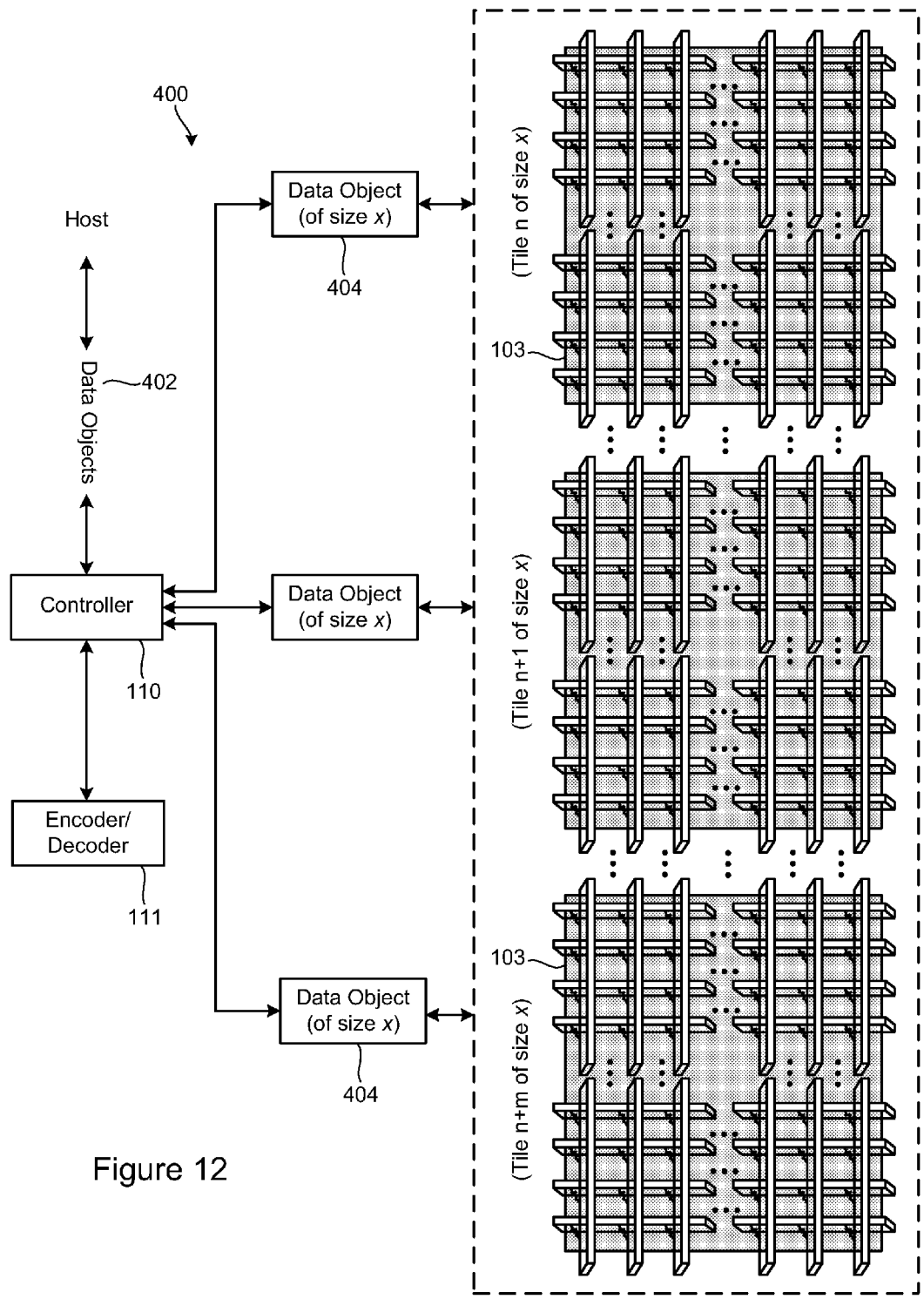
FIG. 12 is a block diagram of an apparatus for storing user data in a solid-state memory comprising cross-point memory arrays of resistance-change memory cells in accordance with various embodiments.

FIG. 12 is a block diagram of an apparatus for storing user data in a solid-state memory comprising cross-point memory arrays of resistance-change memory cells in accordance with various embodiments. The apparatus 400 shown in FIG. 12 includes a controller 110 coupled to a solid-state memory 410 and to an host via an appropriate interface. The controller 110 is configured to receive user data from the host and to store the user data in the memory 410. The controller 110 is also configured to access data stored in the memory 410 and transfer this data to the host. The user data received from the host is in the form of data objects 402 of a predefined size equal to a minimum logical block size used by a host file system. In some embodiments, the controller 110 cooperates with an encoder/decoder 111 to process user data transferred between the controller 110 and the memory 410. For example, the controller 110 and the encoder/decoder 111 can be configured to append one or more of ECC, EDC, and padding bytes to the data object blocks received from the host.

The memory 410 comprises a multiplicity of memory tiles 103 each having a size sufficient to store at least one block of host data. As previously discussed, each block of host data may be appended to include ECC, EDC, and/or padding bytes, in which case each memory tile 103 has a size sufficient to accommodate one block of host data plus any additional ECC, EDC, and/or padding bytes. In this illustrative embodiment, an individual memory tile 103 comprises a multiplicity of resistance-change memory cells arranged in a cross-point array structure sufficient to store at least one data object 402 of user data. Because the size of each memory tile 103 is matched to accommodate at least the size of each data object 402, and because all memory cells within each memory tile 103 are selected during write and read operations, leakage current interference between memory cells within individual memory tiles 103 is mitigated.

According to some embodiments, each memory tile 103 is segregated from other memory tiles 103 of the memory 410 to mitigate the effects of leakage current between memory tiles 103. In some embodiments, select devices (e.g., transistors) peripheral to the memory tiles 103 (i.e., not incorporated within the cross-point memory arrays) are coupled to each bit line and word line of a given memory tile 103. These select devices serve to mitigate the flow of leakage current between memory tiles 103. The bit line-selection devices (not shown) connect the memory tile bit lines to global bit lines. The word line-selection devices (not shown) are used to drive the read voltage to the selected word line and provide other biases during SET and RESET operations, and are coupled to global word lines.

It can be appreciated that matching the storage size of the memory tiles 103 to the minimum logical block size of the host file system provides for a significant reduction in complexity of the host file system. Because the size of the memory tiles 103 are matched to the size of user data blocks, the host file system need not be configured to track user data stored in partially filled memory structures (e.g., unused memory cells of a given memory structure or the same memory structure storing disparate user data).

Figure 13:
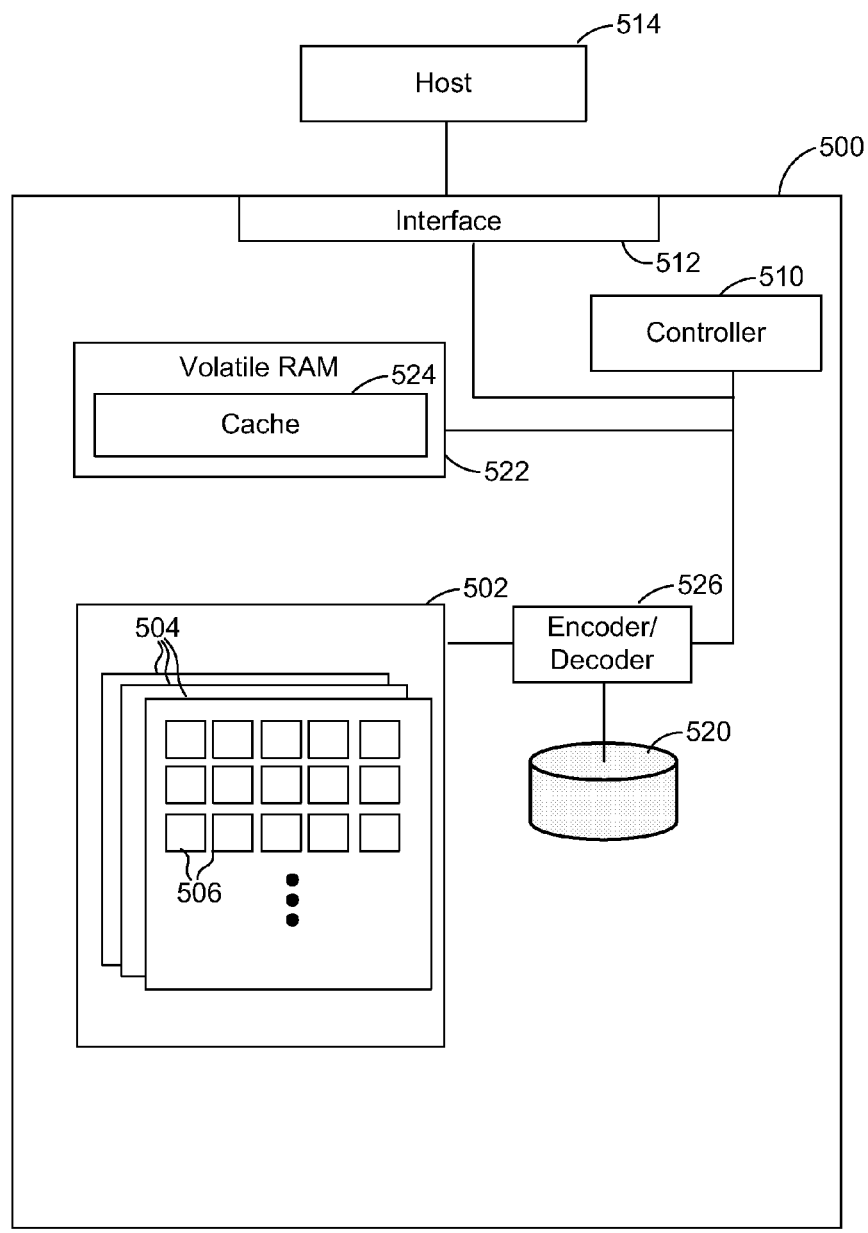
FIG. 13 is a block diagram of a memory storage apparatus according to an example embodiment.

FIG. 13 is a block diagram of a memory storage apparatus 500 according to an example embodiment. The apparatus 500 may be configured as a solid-state drive (SSD) (or sub-component thereof) that utilizes resistive memory in place of or in addition to other types of solid state memory, such as flash memory. The features of the apparatus 500 may be applicable to other types of hard drive devices, such as hybrid drives that use a combination of solid-state memory types and/or magnetic recording disks 520. The features of the apparatus 500 may also be applicable to other types of memory devices, such as special purpose data storage devices (or sub-components thereof) that do not utilize standardized hard drive data interfaces.

The apparatus 500 includes a controller 510 which is configured to cooperate with a host 514 via an interface 512. The controller 510 is coupled to volatile random-access memory 524, which is configured to include cache memory 522. The controller 510 is configured to coordinate the transfer of data to and from a non-volatile memory unit 502. Date encoding and decoding can be effected by an encoder/decoder unit 526 coupled to the controller 510 and the memory unit 502. The memory unit 502 may contain some or all of the non-volatile memory of the apparatus 500.

The memory unit 502 may include one or more discrete physical memory units 504 implemented as memory chips or cards, for example. Within each of the physical memory units 504, the memory may be grouped into smaller units, such as the aforementioned memory tiles 506. For purposes of illustration and not of limitation, the smallest host-addressable unit of memory is referred to as a memory tile 506, which may be considered analogous to a page. A memory tile 506 generally includes a plurality of non-volatile memory cells arranged in one or more cross-point memory arrays. For example, if each memory cell can store two bits of data and each memory tile 506 stores 512 bytes (4096 bits) of data, then 2048 memory cells are used for each memory tile 506. In such a case, each megabyte of memory would include 2048 individually addressable memory tiles 506.

The tile-based addressing scheme described above may be used by the host file system for purposes of efficiency. For example, if the host file system uses a 32-bit logical address to access individual memory tiles 506, the host file system can use around $4.3 \times 10^9$ individual addresses. If the logical addresses were mapped to individual bytes, this would limit the memory to a maximum capacity of 4 GB. Using 512 byte memory tiles 506 allows a 32-bit address to access up to 2 TB of data. The amount of addressable memory can be increased further by using longer size address words (e.g., 64-bit), larger memory tiles sizes, etc.

Figure 14:
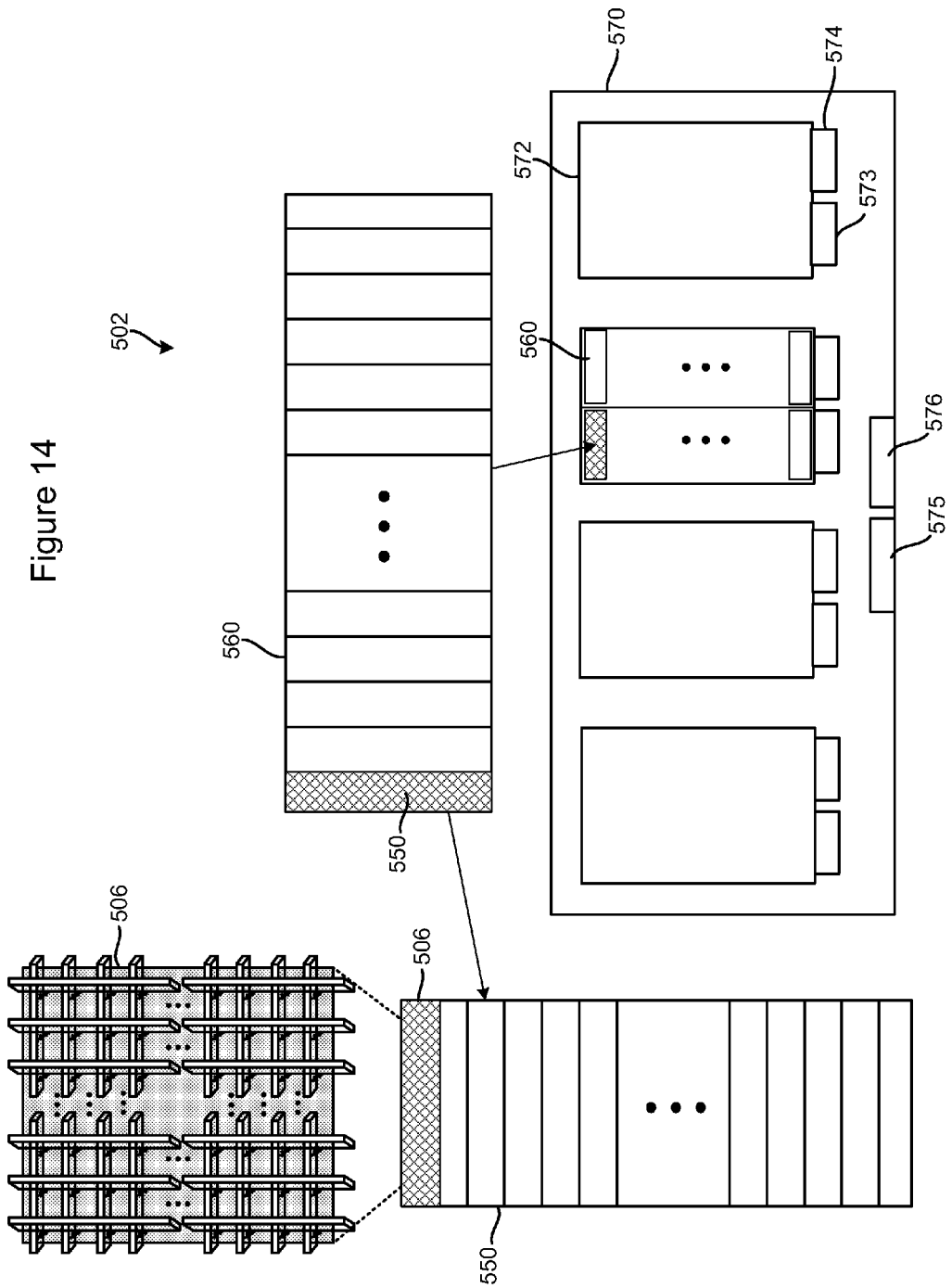
FIG. 14 is a block diagram of a representative mass memory arrangement comprising cross-point memory arrays of resistance-change memory cells in accordance with various embodiments.

According to various embodiments, the memory unit 502 can be arranged in the manner illustrated in FIG. 14. According to the memory architecture implementation shown in FIG. 14, the smallest host-addressable unit of memory is a memory tile 506, which is of a size equal to the minimal block address size of the host file system for reasons discussed hereinabove. A multiplicity of memory tiles 506 (e.g., 128 tiles) can be arranged to define a memory brick 550. A multiplicity of the memory bricks 550 (e.g., 16) can be arranged to define a memory sub-plane 560. A multiplicity of the sub-planes 560 (e.g., 32) can be arranged to define a memory plane 572. A mass memory unit 570 can be defined to include a multiplicity (e.g., 4) of memory planes 572. Access to each memory plane 572 of the mass memory unit 570 can be coordinated by a plane controller 574 via a plane interface 573. A master controller 575 is configured to coordinate data transfer to and from the mass memory unit 570 with the controller of apparatus 500 via a master interface 576.

The various embodiments described above may be implemented using circuitry and/or software modules that interact to provide particular results. One of skill in the computing arts can readily implement such described functionality, either at a modular level or as a whole, using knowledge generally known in the art. For example, the flowchart illustrations disclosed herein may be used to create logic circuits or computer-readable instructions/code for execution by a processor. Such instructions may be stored on a computer-readable medium and transferred to the processor for execution as is known in the art.

The foregoing description of the example embodiments has been presented for the purposes of illustration and description. It is not intended to be exhaustive or to limit the inventive concepts to the precise form disclosed. Many modifications and variations are possible in light of the above teaching. Any or all features of the disclosed embodiments can be applied individually or in any combination are not meant to be limiting, but purely illustrative. It is intended that the scope be limited not with this detailed description, but rather determined by the claims appended hereto.

What is claimed is:

1. An apparatus, comprising:
   a plurality of addressable memory tiles each comprising one or more cross-point arrays, each array comprising a plurality of non-volatile resistance-change memory cells; and
   a controller configured to couple to the array and to a host system, the controller configured to perform:
      receiving, from the host system, one or more data objects each having a size equal to a predetermined logical block size; and
      storing the one or more data objects in a corresponding integer number of one or more of the memory tiles.

2. The apparatus of claim 1, wherein the controller is configured to append one or more of error correcting code bytes, error detecting code bytes, and pad bytes to the one or more data objects such that the total storage required for each of the one or more data objects exactly matches the storage capacity of an integer number of the memory tiles.

3. The apparatus of claim 1, wherein each of the memory tiles has a size that exactly matches a logical block size used by a file system of the host system.

4. The apparatus of claim 1, wherein the controller is configured to mitigate leakage current interference between memory cells of the respective one or more memory tiles by selecting all memory cells of the one or more memory tiles during a write operation or a read operation.

5. The apparatus of claim 1, wherein:
a resistance-change memory cell is provided at each cross-point of the array;
the memory cells are accessible via select components; and
the select components are peripheral to the array.

6. The apparatus of claim 1, wherein:
a resistance-change memory cell is provided at each cross-point of the array; and
each of the cross-points is devoid of a component configured to mitigate leakage current.

7. The apparatus of claim 1, wherein:
a resistance-change memory cell is provided at each cross-point of the array; and
each of the cross-points is devoid of a select transistor.

8. The apparatus of claim 1, wherein:
a resistance-change memory cell is provided at each cross-point of the array; and
each of the cross-points is devoid of a diode configured to mitigate leakage current.

9. The apparatus of claim 1, wherein the resistance-change memory cells comprise resistive random-access memory cells.

10. The apparatus of claim 1, wherein the resistance-change memory cells comprise phase-change random-access memory cells.

11. The apparatus of claim 1, wherein the resistance-change memory cells comprise spin-torque random-access memory cells.

12. The apparatus of claim 1, wherein the resistance-change memory cells comprise ferroelectric random-access memory cells.

13. The apparatus of claim 1, wherein the resistance-change memory cells comprise programmable metallization cells.

14. The apparatus of claim 1, wherein the resistance-change memory cells comprise carbon nanotube random-access memory cells or nanowire random-access memory cells.

15. An apparatus, comprising:
a cross-point memory array comprising:
a plurality of word lines;
a plurality of bit lines intersecting the plurality of word lines at a plurality of cross-points;
a resistance-change memory cell provided at each of the cross-points, each of the memory cells having an area of $4F^2$, where F denotes a minimum working dimension, and the resistance-change memory cells defining a plurality of addressable memory tiles; and
a controller configured to couple to the cross-point array and to a host system, the controller configured to perform:
receiving, from the host system, one or more data objects each having a size equal to a predetermined logical block size; and
storing the one or more data objects in a corresponding integer number of one or more memory tiles of the array.

16. The apparatus of claim 15, wherein the apparatus comprises a plurality of the cross-point arrays arranged as a stack of n layers.

17. The apparatus of claim 15, wherein:
the apparatus comprises a plurality of the cross-point arrays arranged as a stack of n layers; and
an effective size of each memory cell is 4F2/n.

18. A method, comprising:
receiving one or more data objects each having a size equal to a predetermined logical block size; and
storing the one or more data objects in a corresponding integer number of one or more addressable memory tiles each comprising one or more cross-point arrays, each array comprising a plurality of cross points and each cross point comprising a non-volatile resistance-change memory cell and devoid of a select component.

19. The method of claim 18, wherein:
each of the memory tiles has a size that exactly matches the predetermined logical block size; or
the method further comprises appending one or more of error correcting code bytes, error detecting code bytes, and pad bytes to the one or more data objects such that the total storage required for each of the one or more data objects exactly matches the storage capacity of an integer number of the memory tiles.

20. The method of claim 18, wherein the memory cells comprise one of resistive random-access memory cells, phase-change random-access memory cells, spin torque transfer random-access memory cells, programmable metallization memory cells, ferroelectric random-access memory cells, carbon nanotube random-access memory cells, and nanowire random-access memory cells.

* * * * *